United States Patent [19]

Cable et al.

[11] Patent Number: 5,589,285

[45] Date of Patent: Dec. 31, 1996

[54] ELECTROCHEMICAL APPARATUS AND PROCESS

[75] Inventors: Thomas L. Cable, Newbury; Michael A. Petrik, Highland Hts., both of Ohio

[73] Assignee: Technology Management, Inc., Cleveland, Ohio

[21] Appl. No.: 455,099

[22] Filed: May 31, 1995

Related U.S. Application Data

[63] Continuation-in-part of Ser. No. 118,524, Sep. 9, 1993, Pat. No. 5,445,903.

[51] Int. Cl.$^6$ ................................................. H01M 8/00
[52] U.S. Cl. ........................... 429/13; 429/30; 429/31; 429/33; 429/34; 429/35; 429/38; 429/39; 429/218
[58] Field of Search .............................. 429/33, 34, 35, 429/31, 32, 38, 39, 218, 30, 13

[56] References Cited

U.S. PATENT DOCUMENTS

| | | | |
|---|---|---|---|
| 3,578,502 | 5/1971 | Tannenberger et al. | 136/120 |
| 4,088,501 | 5/1978 | Ellis et al. | 106/52 |
| 4,317,865 | 3/1982 | Trocciola et al. | 429/41 |
| 4,331,565 | 5/1982 | Schaefer et al. | 252/462 |
| 4,476,246 | 10/1984 | Kim et al. | 502/304 |
| 4,490,444 | 12/1984 | Isenberg | 429/31 |
| 4,517,260 | 5/1985 | Mitsuda | 429/41 |
| 4,547,437 | 10/1985 | Isenberg et al. | 429/30 |
| 4,582,766 | 4/1986 | Isenberg et al. | 429/30 |
| 4,590,090 | 5/1986 | Siemers et al. | 427/34 |
| 4,597,170 | 7/1986 | Isenberg | 29/623.5 |
| 4,598,467 | 7/1986 | Isenberg et al. | 29/623.5 |
| 4,702,971 | 10/1987 | Isenberg | 429/31 |
| 4,770,955 | 9/1988 | Ruhl | 429/33 |
| 4,812,329 | 3/1989 | Isenberg | 427/115 |
| 5,028,036 | 7/1991 | Sane et al. | 266/227 |
| 5,147,735 | 9/1992 | Ippommatsu et al. | 429/30 |
| 5,177,035 | 1/1993 | Gee et al. | 501/82 |
| 5,240,480 | 8/1993 | Thorogood et al. | 96/55 |
| 5,277,995 | 1/1994 | Ruka et al. | 429/31 |
| 5,411,767 | 5/1995 | Soma et al. | 429/453 |
| 5,445,903 | 8/1995 | Cable et al. | 429/33 |

FOREIGN PATENT DOCUMENTS

0399833A1 11/1990 European Pat. Off. .

OTHER PUBLICATIONS

Tuller et al, "Doped Ceria as a Solid Oxide Electrolyte" J. Electrochem. Soc, vol. 122, No. 2, pp. 255–259, 1975 no month available.

Singhal et al., "Anode Development for Solid Oxide Fuel Cells" Report to the US Department of Energy, Dec. 1986.

Maskalick et al "Contaminant Effects in Solid Oxide Fuel Cells", Report to the US Department of Energy (For period of performance ending Jun. 1992, undated).

Stonehart, P., "Hydrocarbon Fuel Supply Considerations for Solid Oxide Fuel Cells" Article 14 from Fuel Cell Workshop (pages unnumbered) sponsored by EPRI and Gas Research Institute. (Apr. 4–5, 1995).

Primary Examiner—Bruce F. Bell
Attorney, Agent, or Firm—Renner, Kenner, Greive, Bobak, Taylor & Weber

[57] ABSTRACT

The electrical performance of an electrochemical apparatus such as a fuel cell and the durability of the fuel cell elements can be significantly enhanced and extended by the addition of an element between at least one electrode (the oxygen electrode and/or the fuel electrode) and the electrolyte. Performance can be additionally enhanced by the design of at least one electrode to alter its flow characteristics. An integrated separator element can additionally function as at least one electrode of the fuel cell. The electrochemical apparatus is tolerant of the utilization of sulfur bearing fuels.

41 Claims, 5 Drawing Sheets

ELECTROCHEMICAL APPARATUS AND PROCESS

CROSS-REFERENCE TO RELATED APPLICATIONS

This application is a continuation-in-part of patent application, U.S. Ser. No. 08/118,524, filed Sep. 9, 1993, U.S. Pat. No. 5,445,903.

TECHNICAL FIELD

The present invention is directed to electrochemical apparatus such as molten salt or solid electrolyte fuel cells and fuel cell assemblies for directly converting chemical energy into electricity. More particularly, it is directed to fuel cells which are tolerant of sulfur-bearing fuels, and a process for the utilization of sulfur bearing fuels.

BACKGROUND OF THE INVENTION

The invention is directed generally to electrochemical apparatus for the oxidation or consumption of a fuel and the generation of electricity, such as molten salt or solid electrolyte fuel cells.

Although particular embodiments are applicable to conventional cofired or bonded solid electrolyte fuel cell apparatus, the present invention is particularly useful when utilizing non-cofired or nonbonded solid oxide electrolyte fuel cells, preferably planar, that contain a stack of multiple assemblies. Each assembly comprises a solid electrolyte disposed between a cathode and an anode, being bounded by separators which contact the surfaces of the electrodes opposite the electrolyte. A fuel manifold and an air manifold pass gases through or over the assembly elements, with a gasket sealing the anode adjacent to the air manifold and a gasket sealing the cathode adjacent to the fuel manifold to minimize fuel and air mixing in a zone which would decrease cell voltage.

The fuel cell operates by the introduction of air into the cathode and the ionization of oxygen at the cathode/electrolyte surface. The oxygen ion moves across the gas-nonpermeable electrolyte to the anode interface, where it reacts with the fuel flowing into the anode, releasing heat and giving up its electron to the anode. The electron passes through the anode and separator to the next adjacent cathode.

Hydrogen- or hydrocarbon-containing fuels can be used in the electrochemical apparatus of the present invention, such as hydrogen, carbon monoxide, methane, natural gas, (including landfill gas) and reformed hydrocarbon fuels (including diesel and jet fuel). The gas to be supplied to the cathode can be oxygen or an oxygen-containing gas such as air, $NO_x$, or $SO_x$.

Cermet electrodes for cofired, or bonded, solid oxide electrochemical fuel cells, preferably tubular in shape, are disclosed in U.S. Pat. No. 4,582,766 to Isenberg et al. (Westinghouse Electric Company). Electronic conductors (metals) form the electrode and are bound to the electrolyte by a ceramic coating which is preferably the same material as the electrolyte. The metal electrode particles are oxidized and then reduced to form a porous metal layer which contacts both the ceramic coating and the metal electrode particles. The problems of ceramic-metal thermal expansion mismatch are not solved, and are indeed increased by the electrolyte/electrode bonded structure. In the bonded structure, the materials which are to comprise the electrodes and electrolyte are cofired, or diffusion bonded to each other to form a unitary structure.

The cofired or bonded solid oxide electrolyte fuel cells have practically no tolerance to sulfur bearing fuels. The performance of the cofired or bonded solid oxide electrolyte fuel cells degrades considerably when used in a process to utilize sulfur bearing fuels, even at concentrations as low as 1 part per million (ppm).

Isenberg et al. in U.S. Pat. No. 4,582,766, and Isenberg in U.S. Pat. No. 4,597,170, propose to use nickel, cobalt and alloys or mixtures thereof as the electrode conductive material, as being more sulfur resistant than other metals or metal oxides.

The performance degradation experienced using sulfur bearing fuels with cofired or bonded solid oxide electrolyte fuel cells prompted Westinghouse to modify the anode bonded to the electrolyte by coating the anode with a gas permeable oxygen-ionic-electronic conductor material coating which was sinter or diffusion attached, disclosed in U.S. Pat. Nos. and 4,702,971 and 4,812,329 to Isenberg. A cell having such a coated fuel electrode was tested for 16 hours using a hydrogen, carbon monoxide, water vapor fuel containing 50 ppm hydrogen sulfide and experienced 4.7% performance loss. Extended operation, or thermal cycling caused the anode coating to crack and flake off, however, and resulted in the poisoning of the underlying bonded anode.

Additional sulfur tolerance test results by Westinghouse for cofired or bonded fuel cells are contained in the final technical report to the U.S. Department of Energy, "Anode Development For Solid Oxide Fuel Cells", Report No. DOE/MC/22046-2371, December 1986. Various anode materials were tested in cofired or bonded fuel cell designs using a hydrogen, carbon monoxide, water vapor fuel containing sulfur species in amounts of 2 ppm, 10 ppm, 25 ppm and 50 ppm. The report concluded that cell performance degraded rapidly for about the first two hours of sulfur bearing fuel utilization, and at a slow, linear rate thereafter, in the presence of as low as 2 ppmv $H_2S$ in the fuel. The incorporation of cobalt in the bonded anode did not improve sulfur tolerance, while impregnation of the anode with nickel and samarium doped cerium oxide reduced cell degradation (although performance gradually decreased with time, attributed to film cracking and sintering). The degradation in fuel cell performance was found to be reversible, with recovery of cell voltage and resistance when the sulfur was removed from the fuel.

The level of sulfur represented by 50 ppm hydrogen sulfide in hydrogen is not the worst case that would be experienced by the use of potential sources of fuel for fuel cells. Fuel gases derived from liquid fuels such as diesel and jet fuels, coal derived gases and landfill gases may contain hydrogen sulfide levels of about 300 to 1000 ppm, or even higher.

It is an object of the present invention, therefore, to provide a fuel cell capable of utilizing sulfur bearing fuels with stable operating performance over extended periods of time.

SUMMARY OF THE INVENTION

We have found that nonbonded solid oxide electrolyte fuel cells can utilize sulfur bearing fuels with surprisingly stable performance over extended periods of time. Performance of the nonbonded solid oxide electrolyte fuel cells is even less affected by the utilization of sulfur bearing fuels when an interfacial layer of sulfur tolerant material is disposed between the electrolyte and the fuel electrode, or anode, preferably in intimate contact with the electrolyte.

The present invention therefore provides a process for utilizing a sulfur bearing fuel in an electrochemical apparatus including introducing a fuel containing at least about 2 ppm sulfur species, at reaction temperature, into a non-bonded solid oxide electrolyte fuel cell, and reacting said fuel.

The present invention further provides an electrochemical apparatus comprising a fuel cell having an electrolyte disposed between a fuel electrode and a second electrode, wherein a fuel electrode material interfacial layer is further disposed between the electrolyte and the fuel electrode, wherein at least one of the interfacial layer and the fuel electrode comprises at least one sulfur tolerant material. Preferably, a sulfur tolerant interfacial layer intimately contacts the surface of the electrolyte proximate to the fuel electrode.

The present invention also provides an electrochemical apparatus comprising a fuel cell having an electrolyte disposed between a fuel electrode and a second electrode, wherein a fuel electrode material interfacial layer is further disposed between the electrolyte and the fuel electrode, said interfacial layer comprising at least one sulfur tolerant material comprising a conductor selected from the classes consisting of electronic, ionic, mixed ionic/electronic and combinations thereof.

The present invention further provides a process for utilizing a sulfur bearing fuel in an electrochemical apparatus including providing a fuel cell having an electrolyte disposed between a fuel electrode and a second electrode, wherein a fuel electrode material interfacial layer is further disposed between the electrolyte and the fuel electrode, and wherein at least one of the interfacial layer and the fuel electrode comprises at least one sulfur tolerant material;

introducing a fuel containing at least about 2 ppm sulfur species, at reaction temperature, into said fuel cell; and, reacting said fuel.

Preferably, a sulfur tolerant interfacial layer intimately contacts the surface of the electrolyte proximate to the fuel electrode.

In a further embodiment, both the electrical performance of an electrochemical apparatus such as a fuel cell and the durability of the fuel cell elements can be significantly enhanced and extended by the addition of an element between at least one electrode (the oxygen electrode and/or the fuel electrode) and the electrolyte according to the present invention. This additional element may comprise a sulfur tolerant material. Performance can be further enhanced by the design of at least one electrode to alter its flow characteristics according to another embodiment of the invention. The enhanced flow anode may comprise a sulfur tolerant material. The ease of fabrication as well as the economics of production are increased by the present invention which also provides an integrated separator element that functions additionally as at least one electrode of the fuel cell.

The present invention is therefore further directed to an electrochemical apparatus such as a solid electrolyte fuel cell having a solid electrolyte disposed between an oxygen electrode and a fuel electrode, at least one separator contacting the surface of one of the electrodes opposite the electrolyte, and a reactive microslip zone disposed between the electrolyte and at least one electrode, wherein the reactive microslip zone has interconnected pores of a lesser average diameter than the pores of the adjacent electrode, wherein the electrolyte has a fuel electrode material interfacial layer on the electrolyte surface proximate to the fuel electrode, and wherein at least one of the interfacial layer, the fuel electrode, and the reactive microslip zone comprises at least one sulfur tolerant material. The reactive microslip zone preferably comprises a sulfur tolerant material.

The present invention is further directed to an electrochemical apparatus such as a solid electrolyte fuel cell having a solid electrolyte disposed between an oxygen electrode and a fuel electrode in a cell, and at least one separator contacting the surface of one of the electrodes opposite the electrolyte, wherein the electrolyte has a fuel electrode material interfacial layer on the electrolyte surface proximate to the fuel electrode and wherein at least one of the electrodes has enhanced, fixed interconnected porosity of greater than about 50% to about 90% to substantially eliminate gas backflow in the cell, said at least one electrode being contiguous to an electrical contact zone adjacent to the electrolyte, and wherein at least one of the fuel electrode and the interfacial layer comprise at least one sulfur tolerant material. In a preferred embodiment, the fuel electrode comprises a sulfur tolerant material.

The present invention further provides a solid electrolyte electrochemical apparatus having a solid electrolyte disposed between an oxygen electrode and a fuel electrode in a cell, and at least one separator contacting the surface of one of the electrodes opposite the electrolyte, wherein the electrolyte has a fuel electrode material interfacial layer on the electrolyte surface proximate to the fuel electrode and wherein at least one of the electrodes has enhanced, fixed interconnected porosity of greater than about 50% to about 90% to substantially eliminate gas backflow in the cell, said at least one enhanced porosity electrode being contiguous to an electrical contact zone adjacent to the electrolyte, and having a reactive microslip zone disposed between the electrolyte and said at least one enhanced porosity electrode, wherein the reactive microslip zone has interconnected pores of a lesser average diameter than the pores of the enhanced porosity electrode, and wherein at least one of the interfacial layer, the reactive microslip zone, and the fuel electrode comprises at least one sulfur tolerant material.

The present invention is further directed to an electrochemical apparatus such as an assembly of at least two solid electrolyte fuel cells, each said fuel cell having a solid electrolyte disposed between an oxygen electrode and a fuel electrode, and wherein an integrated separator having an area of noncontinuous porosity between a first and a second area of continuous porosity is disposed between and in electrical contact with said at least two fuel cells.

The present invention is further directed to an electrochemical apparatus having at least one integrated separator adjacent to an electrolyte, wherein the integrated separator comprises at least one highly porous gas manifold section of interconnected porosity disposed proximate to the electrolyte, and a gas impervious section.

DETAILED DESCRIPTION OF THE INVENTION

We have found that nonbonded solid oxide electrolyte fuel cells can utilize sulfur bearing fuels with surprisingly stable performance over extended periods of time. While we have seen the performance of certain nonbonded solid oxide electrolyte fuel cells degrade initially when a sulfur bearing fuel is introduced as compared to operation utilizing a sulfur clean fuel, the performance stabilizes and remains relatively constant over extended periods without substantially any further degradation.

We have further found that solid electrolyte fuel cells having nonbonded electrodes respond differently to sulfur than do bonded or cofired fuel cells. Bonded fuel cells, such as those described in the Westinghouse publications, exhibit a continued decrease in performance so long as sulfur bearing fuel is utilized, with a resumption of former activity when sulfur is removed, but a repeated degradation with the reintroduction of the sulfur bearing fuel. This is symptomatic of a surface adsorption/active site poisoning mechanism being involved.

However, we have found that the nonbonded fuel cell system is altered by the introduction of a sulfur bearing fuel by a mechanism as of yet unknown. Sulfidation of the electrode material has been ruled out, as no sulfides have been detected by x-ray diffraction studies of post-sulfur usage anodes. Surface adsorption is not considered to be a dominant mechanism, as the former activity of the fuel cell is not fully recovered when a sulfur clean fuel is reintroduced. However, a permanent, protective change in the microstructure or morphology of the nonbonded materials is believed to occur, because the activity or performance of the nonbonded fuel cells does not further degrade upon repeated introduction of a sulfur-bearing fuel, but rather the previous substantially stabilized performance level is maintained indefinitely.

Performance of the nonbonded solid oxide electrolyte fuel cells is even less affected by the utilization of sulfur bearing fuels when an interfacial layer of sulfur tolerant material is disposed between the electrolyte and the fuel electrode, or anode, preferably in intimate contact with the electrolyte.

The present invention therefore provides a process for utilizing a sulfur bearing fuel in an electrochemical apparatus including introducing a fuel containing at least about 2 ppm sulfur species, at reaction temperature, into a nonbonded solid oxide electrolyte fuel cell, and reacting said fuel. The process of the present invention is highly flexible with respect to the fuel source, as the subject nonbonded fuel cells are suitable for the utilization of gaseous fuel sources such as natural gas, sometimes having sulfur species present in amounts of up to 10 ppm (volume), landfill methane gas having sulfur species present in amounts of 25 to 75 ppm or more, reformed hydrocarbon fuels, such as coal derived fuel gas having sulfur present in amounts up to 1000 ppm or more, and fuel gas from liquid fuels such as diesel and jet fuels having sulfur species present in amounts of up to 500 ppm. Stable performance of nonbonded fuel cells has been realized, even with fuels having 1000 ppm sulfur species. The nonbonded fuel cells, according to the invention, may therefore utilize any of the above fuels, including process gas or synthesis gas, as well as clean fuels, interchangeably.

A nonbonded solid electrolyte fuel cell and assembly containing a plurality of fuel cells is disclosed in U.S. Pat. No. 4,770,955 to Ruhl, which is hereby incorporated by reference as if fully written out below. Although the present invention contemplates the use of nonbonded fuel cells in other configurations, such as molten salt electrolyte and tubular solid electrolyte fuel cells, the planar nonbonded solid electrolyte fuel cell as disclosed in Ruhl is used by way of example, representing a significant step in the advancement of the art, and being directed to non co-sintered elements which provide ease of fabrication as well as extended life due to the ability of the elements to accommodate their differing thermal expansion properties.

Ruhl discloses a fuel cell for oxidizing a fuel to produce electrical energy comprising the following elements:

A plate-like, gas-impervious separator including a first internal hole passing through the first separator for receiving a gaseous fuel.

A plate-like oxide powder cathode in contact with the first separator and including a second internal hole passing through the cathode for receiving a gaseous fuel, the second hole being in at least partial registration with the first hole.

A plate-like, gas-impervious solid electrolyte in contact with the cathode and including a third internal hole passing through the electrolyte, the third hole being in at least partial registration with the first hole.

A substantially gas-impervious tubular gasket disposed within the second hole and sealingly contacting the electrolyte to protect the cathode from fuel within the first hole.

A plate-like powder anode in contact with the solid electrolyte and including a fourth internal hole passing through the anode, the fourth hole being in at least partial registration with the first hole.

An embodiment of the Ruhl fuel cell is also disclosed in which the separator, cathode, electrolyte and anode, respectively include fifth, sixth, seventh and eighth holes for receiving an oxygen-bearing gas, the sixth, seventh, and eighth holes each being in at least partial registration with the fifth hole, and a substantially gas-impervious tubular gasket is disposed within the eighth hole and sealingly contacting the electrolyte to protect the anode from oxygen within the fifth hole.

The solid electrolyte surface of a nonbonded solid oxide fuel cell is generally contacted or "painted" with an ink, or a thin interfacial layer of the composition that comprises the cathode, on the surface adjacent or proximate to the cathode, and with a nickel or nickel oxide ink, or other anode material, on the surface adjacent or proximate to the anode. The interfacial layer provides an environment for electrical conduction and in which the species can interact (molecular/ionic) or react (molecular/atomic).

In a preferred embodiment of the present invention, a nonbonded fuel cell contains an electrolyte (preferably a solid oxide) disposed between a fuel electrode (anode) and a second electrode (cathode), wherein an interfacial layer is disposed between the fuel electrode and the electrolyte, the interfacial layer comprising a sulfur tolerant material. The interfacial layer preferably intimately contacts the electrolyte, proximate to the fuel electrode.

By "sulfur tolerant" material is meant a material which maintains a substantially stable operating performance after equilibration, during and after exposure to sulfur-bearing fuels.

Figure 1:
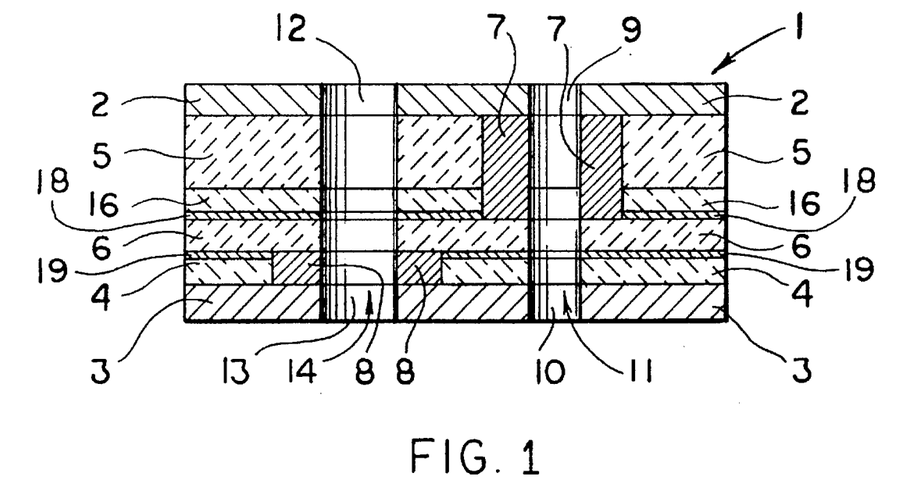
FIG. 1 is a sectional side view of a single fuel cell having a reactive microslip zone in communication with one electrode according to an embodiment of the invention.

Although applicable to other types of electrochemical apparatus, for purposes of this description the invention will be described in relation to its incorporation into a solid electrolyte (oxide) fuel cell. The fuel cell of one embodiment of the present invention is represented in FIG. 1, being a cross-sectional view of fuel cell 1. Fuel cell 1 includes two opposed separators 2 and 3, one of which contacts a fuel electrode or anode 4, and the other of which contacts an oxygen electrode or cathode 5, on their surfaces opposite an intervening electrolyte 6. Tubular gasket 7 forms a seal between separator 2 and electrolyte 6 to protect the cathode from fuel. Tubular gasket 8 forms a seal between separator 3 and electrolyte 6 to protect the anode from oxygen.

In this embodiment, separators 2 and 3 are both impervious to gases and are good electronic conductors. Separators 2 and 3 are preferably identical in construction so that a number of fuel cells 1 can be readily stacked upon each other to establish series electrical connections between adjacent stacked cells. In an assembly containing two or more cells, separator 2 of one cell can function as separator 3 of its contiguous cell, contacting on one surface a cathode and on its opposing surface, an anode.

Separators 2 and 3 contain first internal openings 9 and 10, respectively, which are preferably located so that they may be placed in registration with each other. Cathode 5 and anode 4 and electrolyte 6 of the fuel cell also include internal openings registerable with holes 9 and 10 so that a first internal tubelike passage 11 passing though the fuel cell may be formed for receiving a gaseous fuel.

Gasket 7 also forms a part of the inside surface of tubelike passage 11, providing substantially gas tight seals with separators 2 and electrolyte 6 so that fuel in passage 11 cannot directly contact cathode 5. Gasket 7 must remain impervious to fuel at the relatively high operating temperature of cell 1 and be capable of maintaining a good seal under cell operating conditions. Suitable gaskets can be made from oxidation resistant metal alloys such as nickel-base alloys, from ceramics or from glasses having suitable softening temperatures.

Separators 2 and 3 also contain second internal openings 12 and 13, respectively, that are disposed so that they may be placed in registration with each other. Each of anode 4, cathode 5 and intervening electrolyte 6 also includes a second internal opening registerable with holes 12 and 13 to form a second internal tubelike passage 14 passing through the fuel cell for receiving an oxygen-containing gas. It is within the scope of the invention to include multiple fuel passages 11 and/or oxygen passages 14 in various locations within the cell, preferably close to the centerline of the cell.

Gasket 8 is disposed between separator 3 and electrolyte 6 to form substantially gas-tight seals to protect anode 4 from oxygen within passage 14. Gasket 8 forms part of the inside surface of passage 14. Gasket 8 is preferably made of the same material as gasket 7.

Separators 2, 3 may be made of a high temperature metallic alloy such as stainless steel (type 330), or of an oxide such as doped lanthanum chromite ($LaCrO_3$), and may be about 0.2 mm thick.

Cathode 5 is a porous body having a thickness in the range of about 0.5 mm–2 cm, preferably an oxide having the perovskite crystalline form such as strontium doped lanthanum manganite (LaMnO3), and doped calcium manganite ($CaMnO_3$), lanthanum chromite ($LaCrO_3$), lanthanum cobaltite, ($LaCoO_3$), lanthanum nickelite ($LaNiO_3$), lanthanum ferrite ($LaFeO_3$), or mixtures thereof. The cathode may comprise mixed ionic/electronic conductors such as appropriate doped perovskite oxides listed above. The cathode is prepared by conventional ceramic processing procedures, including pressing a powder, or extruding or tape casting a green body.

Electrolyte 6 is a thin water, less than about 0.3 mm thick, preferably about 0.1 mm or less. Representative electrolytes include zirconia ($ZrO_2$) stabilized with 8 to 10 mole percent of yttria ($Y_2O_3$), doped cerium oxide, doped bismuth oxide, and oxide ion conducting perovskites such as doped $BaCeO_3$. Electrolyte 6 is substantially impervious to gases, however, ionized oxygen can migrate through the electrolyte under the influence of an applied oxygen potential.

The quality of the electrical contact between the cathode 5 and the electrolyte 6 may be improved by initially applying a thin cathode electrolyte interfacial layer 18 of substantially the material that comprises the cathode (or is at least electrochemically compatible with the cathode) to the surface of the electrolyte 6 adjacent or proximate to the cathode in the form of a paint or ink including a volatile vehicle to form an electrical contact zone. Likewise, an anode electrolyte interfacial layer 19 may be applied to the surface of the electrolyte adjacent or proximate to the anode as a paint or ink containing, in one embodiment, substantially anode material such as nickel or nickel oxide, to form such an electrical contact zone. These electrolyte interfacial layers 18,19 may be applied by other conventional techniques also, such as plasma deposition, spin casting, spraying or screen printing.

The thicknesses of the electrolyte interfacial layers are generally on the order of about 1 to less than about 100 microns, and preferably less than 50 microns. It has been found that the thicker this surface coating is applied, the less gas is able to contact the electrolyte, and the more tendency there is for the layer or coating to peel off into the cavities of the electrode pores. Unless specifically stated to the contrary, the electrolyte as mentioned in this Specification shall mean the electrolyte with or without either or both cathode and anode material electrolyte interfacial layers.

In a preferred embodiment of the invention, the sulfur tolerance of the nonbonded solid oxide electrolyte fuel cell is enhanced by the application of an anode electrolyte interfacial layer 19 comprising a composition or mixture of compositions which are sulfur tolerant. The interfacial layer 19 is preferably in intimate contact with the electrolyte 6. Sulfur tolerant materials which are suitable for use as the anode electrolyte interfacial layer include but are not limited to the materials set forth in Table A.

TABLE A

ELECTRONIC CONDUCTORS (I) Metals such as Ag, Co, Cr, Cu, Fe, Ni, Pd, Pt, Ru, and the like, and alloys and mixtures thereof;

(II) Oxides of the general formula $M_yM'_{1-y}O_x$, wherein at least one M element is different than at least one M' element, wherein M is selected from Ba, Nb, Sr, and mixtures thereof, M' is selected from Ti, Sm, Nb and mixtures thereof, and wherein $0 \leq y \leq 1$ and x is a number sufficient to satisfy the valence requirements of the other elements;

(III) Perovskites of the general formula $(A_{1-a}A'_a)(B_bB'_{1-b})O_{3-c}$, wherein A is selected from lanthanides, La, Y, Nb, Ta, Pb and mixtures thereof, A' is selected from alkaline earth metals such as Ba, Ca, Mg, Sr and mixtures thereof, B is selected from lanthanides and mixtures thereof, and B' is selected from Al, Cr, Nb, Ti, Zr and mixtures thereof, wherein $0.9 \leq (A+A')/(B+B') \leq 1.1$, preferably $0.99 \leq (A+A')/(B+B') \leq 1.01$; and wherein $0 \leq a \leq 1$; $0 \leq b \leq 1$; and c is a number that renders the composition charge neutral in the absence of an applied potential;

IONIC AND MIXED IONIC/ELECTRONIC CONDUCTORS (IV) Oxides of the general formula $Me_zMe'_{1-z}O_x$, wherein at least one Me element is different than at least one Me' element, wherein Me is selected from Group 2a and 3a (IUPAC) metals, lanthanides, Cr, Fe, In, Nb, Pb, Sn, Ta, Ti, and mixtures thereof, Me' is selected from Bi, Ce, In, Th, U, Zr and mixtures thereof, and wherein $0 \leq z \leq 1$ and x is a number sufficient to satisfy the valence requirements of the other elements;

(V) Perovskites of the general formula $(D_{1-d}D'_d)(E_eE'_{1-e})O_{3-f}$, wherein D is selected from lanthanides, La, Y, Nb, Ta, and mixtures thereof, D' is selected from alkaline earth metals such as Ba, Ca, Mg, Sr and mixtures thereof, E is selected from lanthanides and mixtures thereof, and E' is selected from Co, Cr, Cu, Fe, Ni, Zr and mixtures thereof, wherein $0.9 \leq (D+D')/(E+E') \leq 1.1$, preferably $0.99 \leq (D+D')/(E+E') \leq 1.01$; and wherein $0 \leq d \leq 1$; $0 \leq e \leq 1$; and f is a number that renders the composition charge neutral in the absence of an applied potential.

The sulfur tolerant materials may comprise only an electronic conductor, only an ionic conductor, only a mixed ionic/electronic conductor, or any electrochemically compatible combination of these three classes or materials within the classes. The sulfur tolerant materials preferably comprise i) at least one electronic conductor and at least one of an ionic conductor or a mixed ionic/electronic conductor and mixtures thereof, or ii) at least one mixed ionic/electronic conductor, optionally with at least one ionic conductor.

These materials must be stable in both the fuel and the sulfur containing species present in the desired application. Alkaline earth metals or rare earth metals are introduced to stabilize conducting oxides.

Examples of sulfur tolerant electronic and ionic or mixed conductors include but are not limited to the following:

TABLE B

ELECTRONIC CONDUCTORS

Metals such as Ag, Co, Cr, Cu, Fe, Ni, Pd, Pt, Ru, and the like, and alloys and mixtures thereof;

Nb-doped $TiO_2$,

Doped $G_yTi_{1-y}O_x$ wherein G is selected from Ca, Ce, Sm, Sr, mixtures and the like, and wherein $0 \leq y \leq 1$, Doped $NbO_2$, Doped $LaCrO_3$, Doped $YCrO_e$.

IONIC OR MIXED IONIC/ELECTRONIC CONDUCTORS

Sc, Tb, Ti, or Y-doped $ZrO_2$,

Gd, La, Sin, or Y-doped $CeO_2$,

Doped $Bi_2O_3$,

Doped $ThO_2$,

Doped $LaFeO_3$,

Doped $UO_2$.

The sulfur tolerant materials useful as the anode electrolyte interfacial layer in the solid oxide electrolyte fuel cell may have any ratio of electronic/ionic or mixed ionic-electronic materials, and may be 100% electronic conducting or 100% ionic or mixed ionic/electronic conducting. Preferably, the sulfur tolerant materials contain metals in the range of about 10% to about 60% by weight, with the lower ratios of metal being most preferred.

Anode 4 is a porous body, and may comprise a finely divided, compressed metallic powder such as nickel or cobalt blended with a stable oxide powder such as zirconia, ceria, yttria or doped ceria. As described above regarding the cathode, the anode may comprise a mixed conductor, optionally combined with an electronically conducting material. The anode 4 may comprise a sulfur tolerant material such as are set forth in Tables A and B, preferred examples of which include ceria or uranium oxide, both or either of which can be doped with an oxide of lanthanum, zirconium or thorium, and optionally containing an electronically conducting phase such as Co, Cr, Cu, Fe, Ni, Pd, Pt, Ru or mixtures or alloys thereof. The thickness of the anode is preferably about 0.1 mm to about 0.5 mm in thickness.

In order to begin operation of the electrochemical apparatus, the fuel cells are heated by an outside heat source to near their operating temperature. Once the electrochemical reaction is initiated, it sustains itself by producing sufficient heat to support the ongoing cell operations. At the same time, an electrical current flows between separators 2 and 3 by virtue of the oxygen ionization and neutralization within each cell. This electrical current, driven by the oxygen potential difference, is the electrical output energy. The preferred operating temperature is close to about 1000° C. In order to produce useful quantities of electricity having a useful voltage, fuel cells of the type shown in FIG. 1 are typically arranged in a series connected stack. Because each of the fuel cells is so thin, hundreds of cells can be assembled in a single stack of reasonable physical size.

We have discovered that a significant improvement in the apparatus physical durability and the current established by the cell is realized by the interposition of a reactive microslip zone 16 between the cathode interfacial layer 18 of electrolyte 6 and the bulk oxygen electrode (cathode 5). In a preferred mode, the reactive microslip zone 16 is made of a high density, tightly packed integral body of particulate cathode material and is characterized by small pores, although it is more porous than the painted ink interfacial layer 18 of the electrolyte.

Similarly, we have found that a significant improvement in the apparatus physical durability and the current established by the cell is realized by the interposition of a reactive microslip zone between the anode interfacial layer 19 of electrolyte 6 and the bulk fuel electrode (anode 4). In a preferred mode, the reactive microslip zone contacting the anode is made of a high density, tightly packed integral body of particulate anode material and is characterized by small pores, although it is more porous than the painted ink interfacial layer 19 of the electrolyte.

Figure 2:
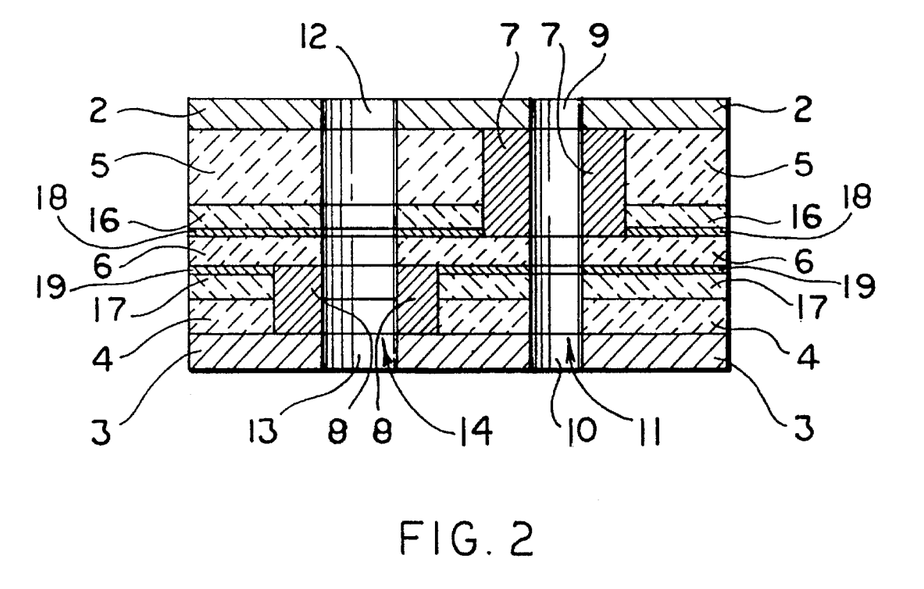
FIG. 2 is a sectional side view of a single fuel cell having a reactive microslip zone in communication with each electrode according to an embodiment of the invention.

In a further preferred embodiment, as shown in FIG. 2, there is disposed between the electrolyte 6 and bulk cathode 5 a reactive microslip zone 16, and disposed between the electrolyte 6 and the bulk anode 4 a reactive microslip zone 17. The reactive microslip zone may be either an integral member as described above, or alternatively a layer continuous with the bulk electrode. The reactive microslip layers 16, 17 described above may also be layers continuous with the bulk electrodes 5, 4 respectively. In either mode, continuous layer or integral member, the porosity of the reactive microslip zone may be graded in the degree of porosity, or in the size of the pores relative to the larger pored adjacent bulk electrode.

While it is preferred that the reactive microslip zones 16 and 17 be made of substantially the same material as the adjacent electrode 5 and 4, the cell benefits from the inclusion of the reactive microslip zone(s) so long as they are made of a material electrochemically compatible with the adjacent electrode(s), that is, another cathode or anode material, respectively, which permits operation of and electron flow within the fuel cell as described above. In a preferred embodiment of the invention, the reactive microslip zone 17, disposed between the electrolyte 6 and anode 4, comprises a sulfur tolerant material as described above in Tables A and B with respect to the anode 4 and anode electrolyte interface layer 19. Preferably, the reactive microslip layer 17 contacts the anode electrolyte interface layer 19 on one surface, and contacts the anode 4 on the opposing surface. More preferably, all three of these elements comprise a sulfur tolerant material electrochemically compatible with each other, and all three may comprise the same sulfur tolerant material. In other embodiments, it may be preferred that the three layers comprise different sulfur tolerant compositions. By "electrochemically compatible" is meant that the materials cooperate in the electrochemical operations of the cell and do not result in competing or deleterious reactions.

The reactive microslip zone 16, 17 is a porous transition layer which allows the diffusion of gas molecules to the electrolyte surface, acts as a mechanical "shock absorber" for cell thermal and mechanical expansion, and is dense enough to provide an excellent electrical contact zone so as to act as the electrical bus to or from the reaction zone. The bulk electrodes 4, 5 may become gas distributors made of large, coarse particles or small particles having large pores in the structure, serving additionally as an electrical bus. As described above, a porosity gradient may be advantageously established across the electrode and the reactive microslip zone which would also make the present invention further applicable to tubular electrodes.

One problem that exists with known fuel cells is that in thermal cycles, such as occurs during heat up and cool down at the beginning and end of operating cycles, there is a physical degradation of the fuel cell elements because of differential movement due to thermal expansion mismatches of the different elements. For example, the paint or ink interfacial layers 18, 19 that may be intimately contacting the electrolyte surfaces abrade against and into the pores of the electrodes. The reactive microslip zones 16, 17 prevent peeling of the interfacial layers or ink while providing enhanced electrical conduction as an intermediate electrical distribution bus between electrode 4, 5 and electrolyte 6.

The reactive microslip zone also provides "microslip", or slight, nondetrimental shifting between the adjacent elements in response to mechanical forces, such as thermal expansion between the elements, acting as a mechanical stress reducer like a shock absorber for compressive movement and a bearing for transaxial movement, while at the same time retaining electrical contact. Further, the reactive microslip zone can deform or extrude to move in horizontal or vertical directions, particularly during cell initialization, in order to accommodate and distribute stresses within the cell and prevent fracturing of the electrolyte.

Because the reactive microslip zones 16, 17 have a smaller diameter porosity than the contiguous electrodes, there is an increase in the contact area between the electrode materials comprising the reactive microslip zones and the electrolyte, increasing electrical conduction at the interfaces and increasing the number of active sites where oxygen molecules can interact with electrons to form oxygen ions at or near the electrolyte surface proximate to cathode 6, and fuel molecules can react with oxygen ions at or near the opposite electrolyte surface, proximate to the anode 5.

In a preferred mode, the reactive microslip zone 16 comprises a mixed conductor material, such that, for example, oxygen ions can form throughout the zone by the ionization reaction taking place within the zone rather than only at its interface with the electrolyte, dramatically increasing the number of active sites. In a further preferred mode, the reactive microslip zone 17 proximate the bulk anode 4 comprises a sulfur tolerant material as set forth above.

The improvement in the current established by the cell having the reactive microslip zone is on the order of about 350% to 500%, increasing from 3 amps up to about 15 amps in test cells. Current densities up to about 800 mA/cm$^2$ and power densities of up to 430 mW/cm$^2$ have been achieved at high fuel utilization.

The reactive microslip zone can be made by prefabrication as well as in situ processing by standard ceramic techniques. The zone can be tape cast with a binder such as a thermoset or thermoplastic binder, coextruded or co-calendared, or can be screen printed or deposited by plasma spray techniques. Whether the reactive microslip zone comprises a separate, integral member within the fuel cell or is continuous with its adjacent bulk electrode depends upon the fabrication technique. The reactive microslip zone is preferably about 50 microns to 200 microns thick.

The reactive microslip zones differ from the "painted ink" interfacial layers at the electrolyte surfaces in that the reactive microslip zones each comprise a robust layer or zone, capable of uniform fabrication, resiliency, and dimensional control in the variability of thickness so as to be able to relieve mechanical stress within the cell. In the embodiment in which the reactive microslip zone comprises an integral member, the handleability and mechanical buffering value of the integral reactive microslip zone member in the green state improves cell assembly procedures as well as the operation of the finished cell. The integral member can mold itself to conform to adjacent cell elements in response to the mechanical forces present in the cell.

The reactive microslip zone, as well as the adjacent or continuous bulk electrode are preferably fabricated to form a gradient in porosity. It is the preferred morphology to provide the smallest particle sizes and smallest pores at the surface where reaction is to occur, such as near the surface of the electrolyte, in order to provide the largest amount of particles and active sites in contact with the zirconia, or other conductor, of the electrolyte. Use of a gradient, however, with larger particle sizes and larger porosity leading up to the smaller pored portion, permits more gas to be provided to the reaction area initially. It is important that the porosity provided in the electrode and microslip zone be interconnected porosity so as to permit the flow of gas through the layers.

In one embodiment of the invention, at least one electrode such as the oxygen electrode (cathode 5) and either alternatively or additionally the fuel electrode (anode 4) are provided as enhanced gas manifolds for gas distribution to active reaction sites. The electrodes are formed to function as gas manifolds by the use of pore formers, providing a fixed interconnected porosity sufficient to substantially eliminate backflow of gases within the cell.

The porosity of the electrodes are preferably in the range of about greater than 50% to about 90%, as measured by mercury porosimetry, and more preferably is greater than about 70%. The pressure drop across the electrodes is generally to be kept within the range of about 2 psi/inch of electrode, and most preferably is about 1 psi/inch. Prior art fuel cells utilizing particulate electrodes typically exhibit pressure drops of 20 psi or greater. Fixed interconnection of the porosity is important to provide an unimpeded path for the gas flow, and comprises means for providing gas flow across at least one electrode having a pressure drop less than about 2 psi/inch, preferably less than about 1 psi/inch.

The interconnected porosity of the enhanced gas flow electrode can be made by the preparation of a ceramic green body of precursors to the electrode material into which green body has been incorporated a thermoset or thermoplastic binder and a pore former such as wax or a salt, for example calcium chloride. After the formation of the green body, the pore former is dissolved out of the green body by heating or by immersion in a solvent for the pore former, leaving an interconnected pathway of voids in the material which can then be fired by conventional procedures. A method for forming interconnected porosity in a ceramic body is disclosed in U.S. Pat. No. 5,028,036, which is incorporated herein by reference as if fully written out below.

Alternate methods of forming the interconnected porosity within the electrode include the use of woven sintered ceramic fibers, or pressed ceramic particles. In the latter method, it is necessary to use particle sizes which are large, in the range of about 40 mesh to 80 mesh (0.177–0.42 mm), and in which there are not a significant amount of smaller sized particles present, which could block the pores between the larger particles. Where particulate electrodes are used, interconnected porosity can still be considered to be fixed if the particle size range is such that small particles do not block pores, and the shifting of large particles into a pore or a passageway between pores creates a shifted void that reestablishes an interconnection to the same or another pore.

In a method related to the pore forming method, a reticulated foam is used as a substrate for the deposition of electrode material to form a precurser, and then the foam is dissolved to form the interconnected pores.

The enhanced porosity oxygen electrode can be made out of conventional sintered ceramic cathode materials disclosed above such as strontium doped lanthanum manganite. The enhanced porosity fuel electrode can be made out of conventional anode materials or metals disclosed above such as nickel or cobalt cermets, for example, nickel zirconia. In a preferred mode, the enhanced porosity fuel electrode comprises at least one sulfur tolerant material set forth above. An enhanced porosity electrode is incorporated into the cell to provide both gas distribution and electrical conductivity. The amount of void space in the electrode should not be so great as to limit the reaction because of a lack of electrically conductive pathways or electrical contact to the adjacent cell elements. A balance is therefore preferable between the lack of gas pressure drop and the conductivity of the electrode.

It is preferred that the enhanced porosity electrode not contact the electrolyte directly because of the possibility of decreased electrical contact with the electrolyte surface. An electrical contact zone of lesser porosity, such as obtained with the electrolyte interfacial layer or a reactive microslip zone would provide the necessary conductivity to operate in desired electrical performance ranges. In one embodiment, the porosity of the enhanced porosity electrode is graded such that the smaller pore sizes occur in the area of the electrolyte interface.

Figure 3:
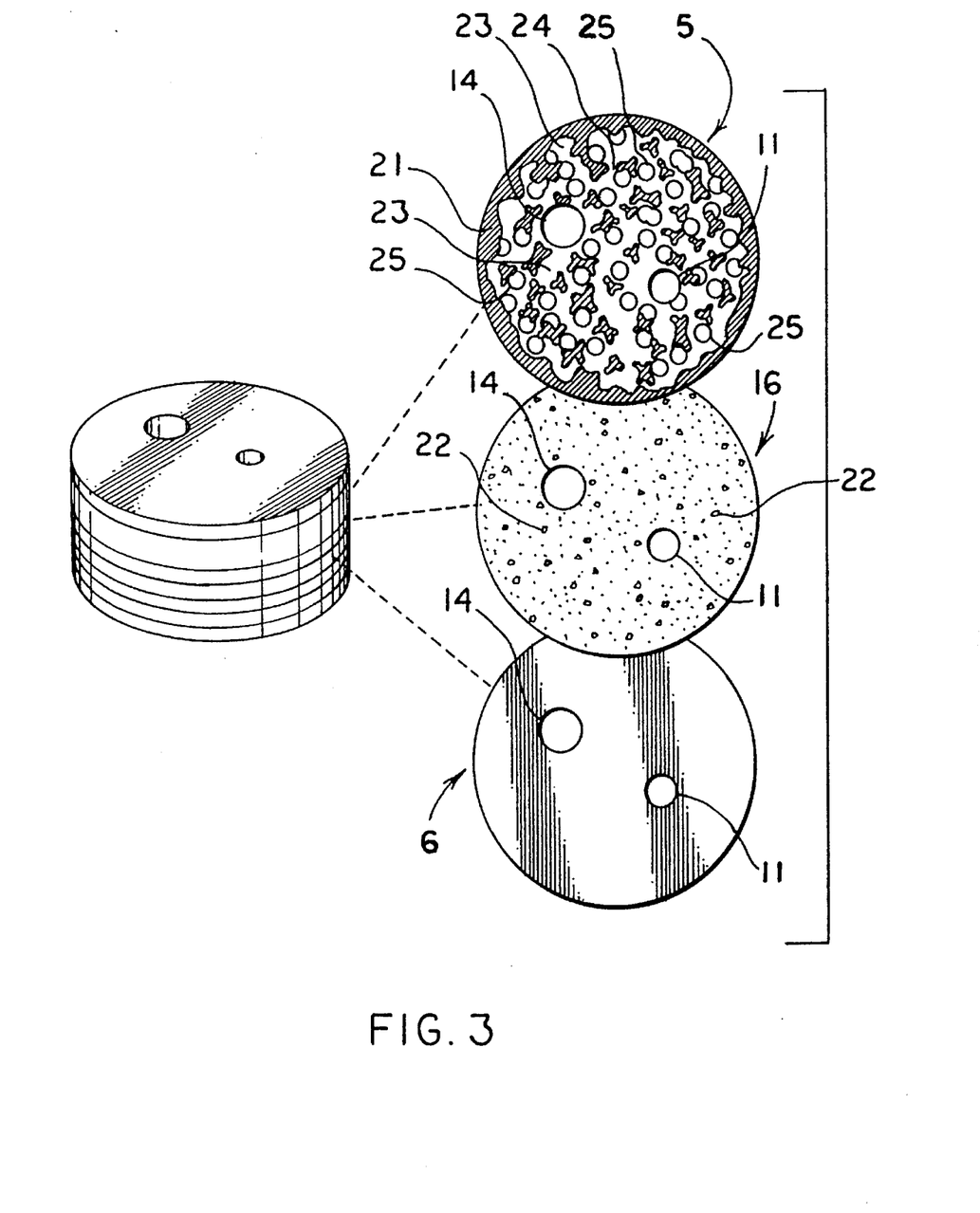
FIG. 3 is a an exploded plan view of a portion of a fuel cell showing a porosity enhanced electrode, a reactive microslip zone member and an electrolyte, according to an embodiment of the invention.

Referring to FIG. 3, a preferred embodiment of the invention is shown in an exploded plan view in which an enhanced porosity planar oxygen electrode (cathode 5) is contiguous to a reactive microslip zone 16 that contacts the electrolyte 6 on its opposite surface. Contained within these elements are fuel passage 11 manifold and oxygen passage 14 manifold which supply gases to the electrodes (anode not shown for clarity). Small pores 22 are present in the reactive microslip zone 16 for the passage of species to the electrolyte 6.

Cathode 5 as shown comprises a substantially dense matrix 21 in which are located large pores 23, which generally assume the shape of the pore former whose removal left the pore 23 voids. In the case of spherical pore formers, the voids left will be generally round, oval or elliptical in shape. Pores 23 are interconnected to other pores within cathode 5 in the plane of the cutaway plan view by horizontal passages 24. Pores 23 are interconnected to other pores within cathode 5 in the planes above and below the cutaway plan view by vertical passages 25. The matrix 21 fills the spaces in the planes above and below the plane of the cutaway plan view that are not occupied by pores or passages. The structure of the anode may be similar to that of the cathode in the embodiment which includes an enhanced porosity fuel electrode. Preferably, the anode comprises a sulfur tolerant material as set forth above.

Although the enhanced flow electrode can be utilized in the electrochemical apparatus without a contiguous reactive microslip zone, the reactive microslip zone serves to provide enhanced electrical distribution by its greater conductor contact area to the surface of the electrolyte. Additionally, the reactive microslip zone protects the surface of the electrolyte, and any electrolyte interfacial layer that may be disposed thereon, from the void containing electrode surface. The enhanced flow cathode 5 enhances performance of the apparatus by facilitating gas distribution and oxygen permeability through the electrode.

In an embodiment of the invention, an integrated component can act as a current collector, gas manifold and cell separator. The integrated separator has at least one highly porous gas manifold section comprising an area of interconnected porosity adjacent to a gas impervious section comprising a dense portion or an area of discontinuous porosity which provides the separator function. The integrated separator is made of a ceramic electrode material such as yttrium chromite, or a metal, and must be conductive.

The integrated separator can replace either the separator and one adjacent electrode in one fuel cell, or the separator and both adjacent electrodes in an assembly of two adjacent fuel cells. The integrated separator provides the electrical contact and the physical separation between two fuel cells, and provides the gas distribution function of at least one adjacent electrode (fuel and/or oxygen). An enhanced reaction surface can be provided by a reactive microslip zone(s) contactingly disposed adjacent to the porous surface(s) and the electrolyte.

The integrated separator can be fabricated by co-calendaring at least one layer of interconnected porosity and a dense or noninterconnected porous layer. Alternatively, the integrated separator can be made from an interconnectedly porous body by a retrofill technique.

Figure 4:
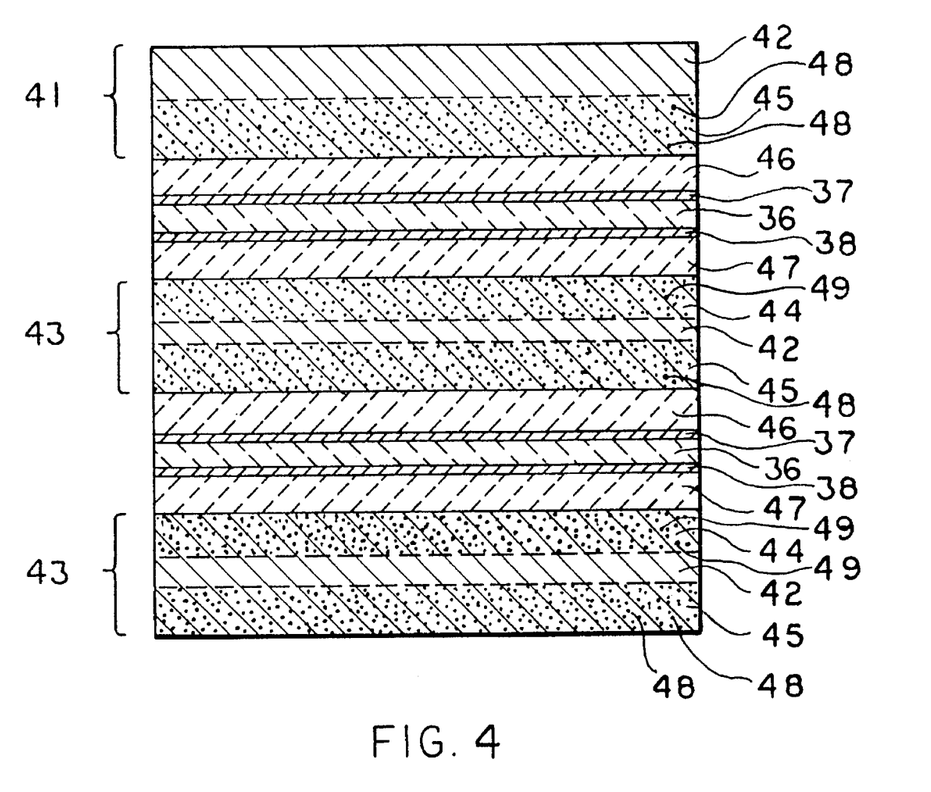
FIG. 4 is a sectional side view of a cutaway portion of an assembly of two fuel cells having an integrated separator according to an embodiment of the invention.

Referring to FIG. 4, terminal integrated separator 41 comprises a gas impervious section 42 of dense material or material of noncontinuous porosity, and a gas manifold section 45 which may function as an oxygen electrode. While integrated separator 41 is shown as the terminal contact of the stacked series of cells, an integrated separator of this configuration, having only one gas manifold area of continuous porosity, may be used in other cells in the stack with an opposed counterelectrode. Gas manifold section 45 in the depicted embodiment, containing pores 48, contacts an integral reactive microslip zone 46 made of material electrochemically compatible with the oxygen gas manifold section 45, disposed between the integrated separator 41 and a solid electrolyte 36.

An integrated separator 43 having a gas impervious central portion 42 is disposed on the opposite side of electrolyte 36, with gas manifold section 44, containing pores 49, serving as the fuel electrode, and contacting an integral reactive microslip zone 47 made of a material electrochemically compatible with the fuel gas manifold section 44. Electrolyte 36 may be contacted with a cathode interfacial layer 37 of compatible cathode type material adjacent to reactive microslip zone 46, and with an anode interfacial layer 38 of compatible anode type material, preferably a sulfur tolerant material, adjacent to reactive microslip zone 47.

Preferably, the gas manifold sections 44, 45 are fabricated to provide enhanced interconnected porosity as described above. The relationship of pore size and porosity of the gas manifold sections 44, 45 to that of the reactive microslip zones 46, 47 may be advantageously structured as described above with regard to the embodiment depicted in FIG. 3.

Figure 5:
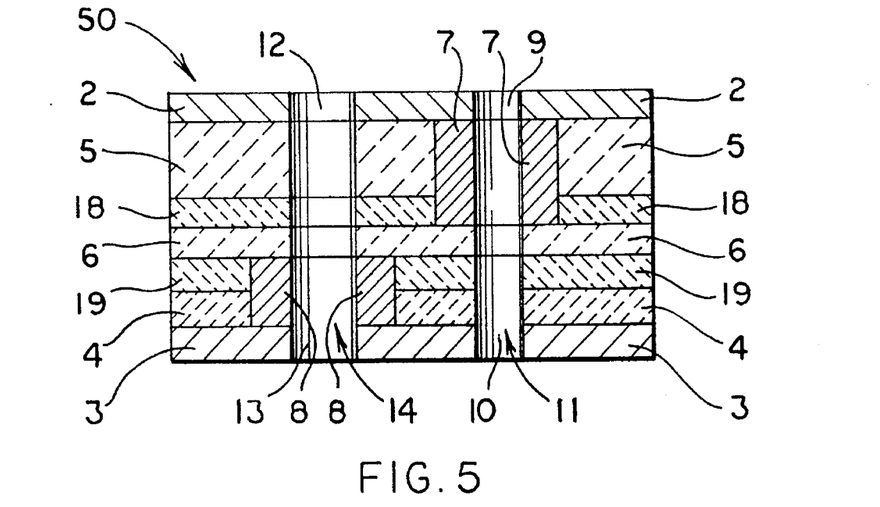
FIG. 5 is a sectional side view of a single nonbonded fuel cell.

An embodiment of the invention in which a reactive microslip layer is not utilized, but in which the fuel cell is sulfur tolerant is shown in FIG. 5. Fuel cell 50, which is nonbonded or non-cosintered, comprises fuel cell elements as described above, including opposed separators 2 and 3, one contacting a fuel electrode or anode 4, and the other contacting an oxygen electrode or cathode 5 on the electrode surfaces opposite an intervening electrolyte 6.

Gasket 7 protects the cathode 5 from fuel passing through passage 11, defined in part by openings 9, 10 in the separators 2,3, while gasket 8 protects the anode 4 from oxygen or an oxygen containing gas within passage 14, defined in part by openings 12,13 in separators 2,3. A cathode electrolyte interfacial layer 18 is interposed between the cathode 5 and the electrolyte 6, and an anode electrolyte interfacial layer 19 is interposed between the anode 4 and the electrolyte 6, the interfacial layers 18,19 preferably being applied to the opposing surfaces of the electrolyte. The fuel cell of FIG. 5, as with those of FIGS. 1–4, are preferably assembled in stacks of multiple cells for operation.

EXAMPLES

Example A

Anode Compatible Integral Reactive Microslip Zone Fabrication.

A slurry for tape casting was prepared by ball-milling a mix containing 37.3 g NiO (tradename Aesar) and 13.5 g Ni metal (tradename Inco 123) and 16.9 g of 8 mol % yttria stabilized zirconia together with a binder mix. The binder consisted of 1.7 g Z3(tradename for Menhaden Fish Oil) as a 50 vol. % solution in toluene, 4.5 g polyvinylbutyrol (tradename Monsanto B79), 2.5 g butyl benzylphthalate (tradename Santicizer 1160) and 2.2 g corn oil. The solvent for the above system contained 18.0 g toluene, 8.0 g ethanol and 4.5 g methylethyl ketone.

The mix was milled for 16–24 hours using cylindrical zirconia grinding media, after which it was decanted from the milling beads. The tape was then cast on a flexible carrier film, supported by a glass plate. A doctor blade gap setting of 10 to 25 mils resulted in a green tape of 2 to 5 mils. After drying for approximately 1 hour the flexible green tape was separated from the carrier film and cut into the desired shape.

Example B

Cathode Compatible Integral Reactive Microslip Zone

A tape casting slurry was prepared by ball-milling together 45.2 g of La.84Sr.15MnO$_3$ powder, 1.68 g of Z3 (tradename for Menhaden Fish Oil) as a 50 vol. % solution in toluene, 2.5 g butyl benzylphthalate (tradename Santicizer 160), 4.5 g polyvinylbutyrol (tradename Monsanto B79) and 2.2 g corn oil. The solvent carrier for the slurry was a mix of approximately 18 g toluene, 8 g ethanol and 4 g methyl ethyl ketone.

A uniform mix was accomplished by milling for 20 hours using cylindrical zirconia grinding media. The slurry was decanted from the grinding media and cast with a doctor blade gap setting of 20 mils onto a plastic carrier film. After drying approximately 1 hour the cast tape was separated from the plastic film and cut into shape.

TABLE I

| Run No. | Cell Elements |
| --- | --- |
| C1 | Reactive microslip member only - No bulk electrode or electrolyte ink layer. |
| C2 | Reactive microslip member only - No bulk electrode or electrolyte ink layer. |
| C3 | Bulk electrodes only no electrolyte "ink" layer or reactive microslip member. |
| C4 | Bulk electrodes only no electrolyte "ink" layer or reactive microslip member. |
| 5 | Bulk electrodes and electrolyte ink layer |
| 6 | Bulk electrodes and electrolyte ink layer |
| 7 | Bulk electrodes and electrolyte ink layer |
| 8 | Bulk electrodes and reactive microslip zone members |
| 9 | Bulk electrodes and reactive microslip zone members |
| 10 | Bulk electrodes, electrolyte ink layer, reactive microslip zone members. |
| 11 | Bulk electrodes, electrolyte ink layer, reactive microslip zone members. |
| 12 | Bulk electrodes, electrolyte ink layer, reactive microslip zone members. |

(Electrolyte ink layer refers to an electrolyte interfacial layer.)

TABLE II

| RUN NO. | H$_2$ Flow (cc/min) | H$_2$ BP* (psi) | Air Flow (cc/min) | Air BP* (psi) | Voltage (V) | Current (Amps) | Power (Watts) |
| --- | --- | --- | --- | --- | --- | --- | --- |
| C1 | 60 | 18.9 | 200 | 24.5 | 0.481 | 0.87 | 0.42 |
| C2 | 85 | 22.2 | 200 | 24.5 | 0.472 | 0.86 | 0.41 |

TABLE II-continued

| RUN NO. | H₂ Flow (cc/min) | H₂ BP* (psi) | Air Flow (cc/min) | Air BP* (psi) | Voltage (V) | Current (Amps) | Power (Watts) |
|---|---|---|---|---|---|---|---|
| C3 | 60  | 0   | 300 | 0   | 0.455 | 0.44  | 0.20 |
| C4 | 100 | 0   | 500 | 1.1 | 0.480 | 0.46  | 0.22 |
| 5  | 60  | 0   | 300 | 0.6 | 0.517 | 3.20  | 1.65 |
| 6  | 100 | 0   | 300 | 0.4 | 0.502 | 4.04  | 2.03 |
| 7  | 120 | 0   | 300 | 0.4 | 0.522 | 4.08  | 2.13 |
| 8  | 60  | 1.2 | 300 | 1.4 | 0.523 | 4.32  | 2.26 |
| 9  | 100 | 1.7 | 500 | 2.0 | 0.561 | 4.56  | 2.55 |
| 10 | 60  | 0   | 300 | 0   | 0.499 | 8.40  | 4.19 |
| 11 | 85  | 0   | 420 | 1.0 | 0.490 | 11.95 | 5.86 |
| 12 | 120 | 0   | 600 | 1.5 | 0.516 | 14.48 | 7.47 |

*BP = Back Pressure

Example A describes the preparation of a reactive microslip zone member for use adjacent a fuel electrode. Example B describes the preparation of a reactive microslip zone member for use adjacent to an oxygen electrode. These were tested in a solid electrolyte fuel cell, together with enhanced porosity bulk electrodes of the same composition as the adjacent reactive microslip zone member, prepared by tape casting according to the procedure set forth in the specification above to achieve 80% porosity by volume.

Table I lists the configuration of the test fuel cells run with air and hydrogen at various flow rates. The results of the test runs are listed in Table II. Back pressure readings listed as zero were below the minimum gauge pressure reading.

In comparative examples C1 and C2, in which no bulk electrodes were utilized in the cell, the reactive microslip member served as the electrode, with no electrolyte interfacial ink layer between the member and the electrolyte. Pressure drop across the members were very high, and higher flow rates could not be achieved due to the magnitude of the pressure drop. Power achieved was very low.

In comparative examples C3 and C4, high porosity bulk electrodes only were used as gas manifolds/electrodes, with no electrolyte interfacial ink layer or reactive microslip member. The pressure drops across the electrodes were practically zero or otherwise very low, however, the electrical contact with the electrolyte was such that very low power output was produced.

In examples 5–7, enhanced porosity electrodes were utilized as well as compatible electrolyte interfacial ink layer adjacent the electrodes. The pressure drops across the fuel electrode were practically zero, and across the oxygen electrode were less than 1 psi/inch of electrode. Current established and power realized from the cells were 5–10 times higher than the comparative cells.

In examples 8 and 9, enhanced porosity electrodes were utilized with reactive microslip zone members between the electrodes and the electrolyte (uncoated). Pressure drops across the electrodes was less than 2 psi/inch and both current and power increased relative to the comparative examples 1–4 and the examples 5–7.

In examples 10–12, cells utilizing the enhanced porosity electrodes reactive microslip zone members and compatible electrolyte interfacial ink layers adjacent each enhanced porosity electrode resulted in pressure drops across the fuel electrode of practically zero and across the oxygen electrode of less than 1.5 psi/inch. The current and power output of these cells were surprisingly enhanced, with nearly 2 to 3 times the current and power performance of the best of the test runs of the previous examples.

The above examples demonstrate that the various embodiments of the present invention provide improved electrical performance of electrochemical apparatus. The various embodiments of the present invention provide lower pressure drops which improve gas distribution for better air utilization, decreasing requirements for high pressure blowers in the balance of systems; and, improve fuel distribution for higher fuel utilization and fuel efficiency.

As discussed above, solid electrolyte fuel cells can operate on a wide range of reformed hydrocarbon fuels, such as coal derived fuel gas, diesel fuel, jet fuel, and natural gas. However, all these fuels contain sulfur, a known poison to the standard nickel/yttria stabilized zirconia (Ni/YSZ) cermet anode used in conventional bonded or cofired solid oxide electrolyte fuel cells. Sulfur is strongly adsorbed on the nickel, blocking sites for electrochemical reactions. A 10% loss in activity has been reported by Westinghouse for cofired, bonded electrode solid electrolyte fuel cells exposed to fuel gas containing as little as 1 ppm of $H_2S$ impurity in the fuel.

We have discovered that solid electrolyte fuel cells having non-bonded electrodes respond differently to sulfur contamination than do those having bonded or cofired electrodes, in that the nonbonded electrode solid electrolyte fuel cells are more tolerant of sulfur. Performance of the non-bonded solid electrolyte fuel cells is not significantly affected by the utilization of sulfur bearing fuels when an interfacial layer of sulfur tolerant material is disposed between the electrolyte and the fuel electrode, or anode, preferably in intimate contact with the electrolyte.

The non-bonded electrodes are further improved by adding a sulfur tolerant, mixed ionic-electronic conducting material to the nickel in the nickel cermet electrode or replacing the nickel cermet material with another sulfur tolerant material. This electrode configuration alters the effect of sulfur on the anode, or fuel electrode. Further, it is theorized that the addition of a sulfur tolerant mixed ionic-electronic conducting phase has the effect of increasing the number of electrochemically active sites at the anode/electrolyte interface, thus improving cell performance and sulfur tolerance. The combination of using non-bonded electrodes and the mixed ionic/electronic composition results in anodes that show no difference when tested with pure hydrogen or with hydrogen containing sulfur contamination.

Comparative example 13. In the DOE report cited above, at page 39, Westinghouse reported that a cofired, bonded electrode solid electrolyte fuel cell having a standard Ni/YSZ anode, operating at 250 mA/cm2, experienced a voltage drop of 16% (from 0.62 to 0.52 V) when exposed to 10 ppm $H_2S$ for 100 hours. The voltage dropped 12% in the first hour followed by another 4% drop over the remainder of the 100 hour test, showing no indication of reaching a steady state level. When $H_2S$ was removed from the fuel the voltage was 100% recovered, demonstrating that bonded, cofired Ni/YSZ electrodes used in solid electrolyte fuel cells are poisoned by sulfur via an adsorption mechanism. When sulfur is removed from the gas feed, sulfur desorbs and 100% of the fuel cell performance is recovered. It is thus implied that no physical changes take place in the structure or morphology of the anode.

Comparative example 14. In a similar Westinghouse test, reported in U.S. Pat. No. 4,812,329, a cofired, bonded solid electrolyte fuel cell operating at 250 mA/cm2 but using fuel containing a 50 ppm sulfur impurity, exhibited a rapid loss of cell performance (greater than 20%) in less than an hour. The cell performance continued to decline with no indication of reaching a steady state performance.

Example 15. A planar, nonbonded solid electrolyte fuel cell having a particulate Ni/YSZ non-bonded fuel electrode, operating at 200 mA/cm2, showed a 13% drop in voltage over a six hour period, when exposed to hydrogen having 500 ppm sulfur. The voltage then remained constant and showed no additional decline with time for the next 18 hours. When the sulfur bearing species was removed and the cell was returned to pure hydrogen fuel, none of the original voltage was recovered. These results indicate a difference in the mechanism of sulfur deactivation on the nonbonded anode.

Figure 6:
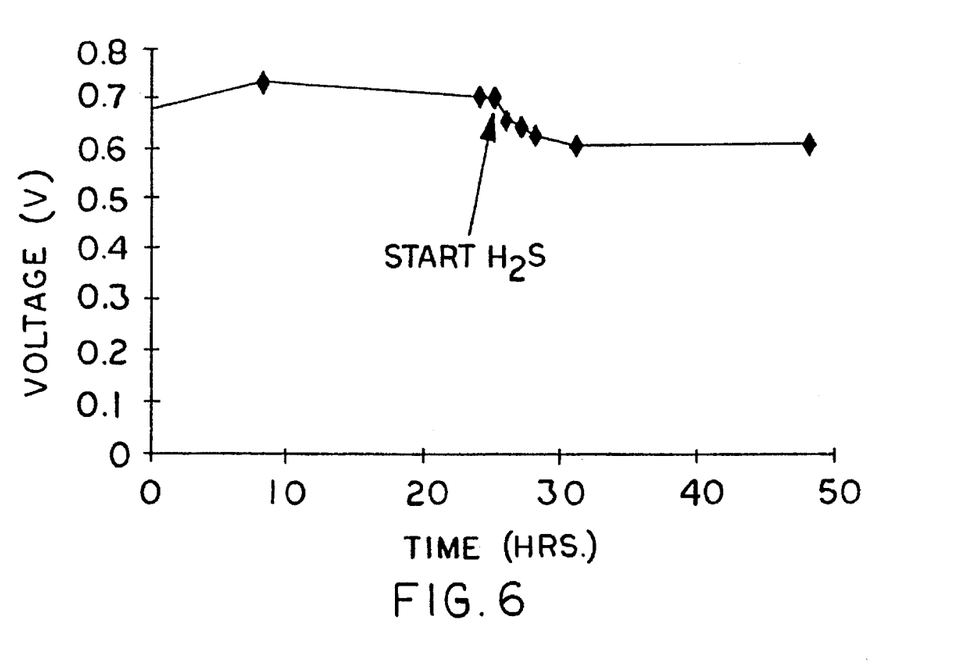
FIGS. 6 through 9 are graphical plots of the change in cell voltage over time in the operation of a fuel cell with the introduction of a sulfur bearing fuel.

FIG. 6 demonstrates the performance of this solid electrolyte fuel cell having a Ni/YSZ particulate anode when operated on hydrogen and hydrogen with sulfur contamination ($H_2S$) at 500 ppm. As compared with Westinghouse results, the process of the present invention using a non-bonded electrode solid electrolyte fuel cell exhibits less of a drop in cell voltage when exposed to sulfur, even when the sulfur concentration was 10 times higher than used in the Westinghouse cosintered, bonded electrode, solid electrolyte fuel cell experiments. Although the nonbonded cell underwent a performance decline, the degree of decline is less than for cosintered fuel cells (approximately 15% decrease in performance) and the performance stabilized at that level.

Unlike the bonded, co-sintered electrode containing fuel cell discussed above, the non-bonded, particulate electrode containing fuel cell did not recover after sulfur was removed from the fuel, indicating that the change in cell performance may be due to morphology changes in the anode structure and not simply due to sulfur adsorption. These results indicate that the non-bonded electrode itself contributes to sulfur tolerance due to a different mechanism of sulfur poisoning. This allows greater latitude in choosing electrode materials, (for example, nickel metal may be incorporated as part of the electrode). Changes in fabrication of the electrode microstructure provides further improvements in the sulfur tolerant characteristics.

Comparative example 16. In the DOE Report cited above, at page 114, the attempt to improve the sulfur tolerance of the Ni/YSZ anode included coating the bonded anode with a protective coating of Sm-doped ceria. In the ceria-coated Ni/YSZ anode tests, using the identical testing conditions for the test as in comparative example 13 using 10 ppm $H_2S$, the cell immediately lost approximately 9% voltage, with a persistent, linear voltage drop for the duration of the 100 hour test. The cell was 100% recovered when the sulfur was removed. These results show that the modified, bonded electrode fuel cell is still susceptible to poisoning at only a 10 ppm sulfur level and that the mechanism of adsorption-desorption is unchanged.

Example 17. A 200 hour life study performed on two identical fuel cells having Ni/doped-$CeO_2$ anodes rather than Ni/YSZ anodes. The Ni/doped-$CeO_2$ anodes were fabricated using non-bonded electrode fabrication techniques. Additionally, the electrolyte interfacial layer proximate to the anode, as well as the reactive microslip zone disposed between the electrolyte and the anode (fuel electrode) comprised the same material as the anode. The cells were operated at a constant current density of 200 mA/cm2 and at a constant fuel feed rate of 100 cc/min. Both cells were initially tested in hydrogen for 24 hours, at which time one cell was switched to hydrogen fuel containing 500 ppm $H_2S$. When exposed to 500 ppm sulfur species, the cell lost 3% power in the first few hours and then showed stable performance for the remainder of the 200 hour life test. The total loss in power during the 200 hour test period was 7.7 percent.

Figure 7:
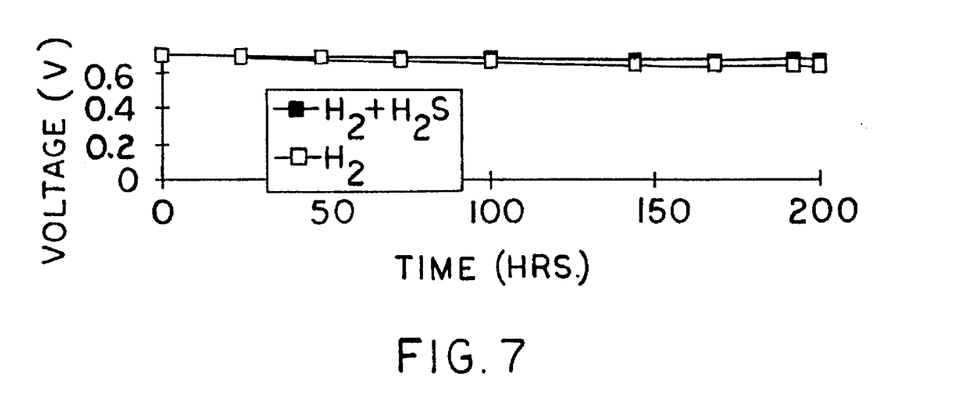

Results are plotted graphically in FIG. 7. As shown in FIG. 7, the duplicate cell, tested only in hydrogen, lost 9.4% power in the same 200 hours. The results demonstrate that the nonbonded anode, comprising a sulfur tolerant mixed ionic-electronic conductor, exhibited no effect due to high concentrations of sulfur. The combination of the non-bonded electrodes configuration and improved anode composition results in an solid electrolyte fuel cell that is completely tolerant of sulfur bearing fuels.

Figure 8:
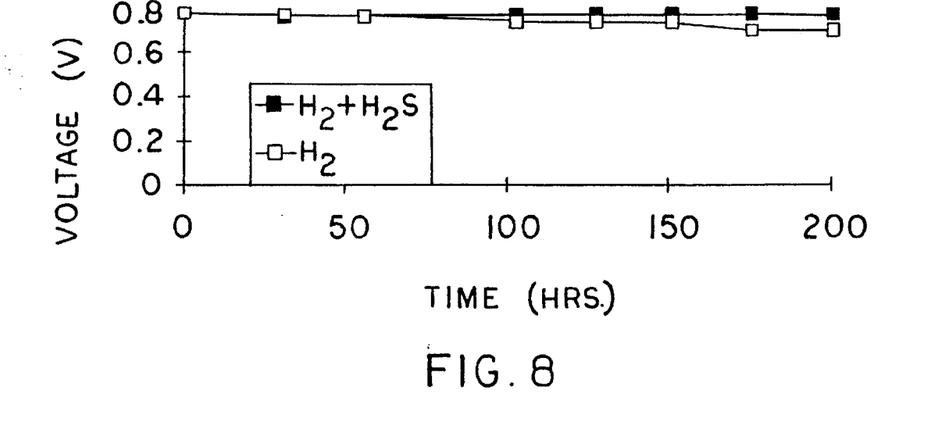

Example 18. A 200 hour life study performed on two identical fuel cells having nonbonded Co/doped-$CeO_2$ anodes rather than Ni/YSZ anodes. The Co/doped-$CeO_2$ anodes were fabricated using non-bonded electrode techniques disclosed above. Additionally, the electrolyte interfacial layer proximate to the anode, as well as the reactive microslip zone disposed between the electrolyte and the anode (fuel electrode) comprised the same cermet material as the anode. The cells were operated at a constant current density of 200 mA/cm2 and at a constant fuel feed rate of 100 cc/min. Both cells were initially tested in hydrogen for 24 hours, at which time one cell was switched to hydrogen fuel containing 500 ppm $H_2S$. When exposed to 500 ppm sulfur, the cell lost 1% power in the first few hours and then showed stable performance for the remainder of the 200 hour life test. The total loss in power during the 200 hour test period was 2.2%. Results are plotted graphically in FIG. 8. As shown in FIG. 8, the duplicate cell tested only in hydrogen lost 9.7% power in the same 200 hours.

Figure 9:
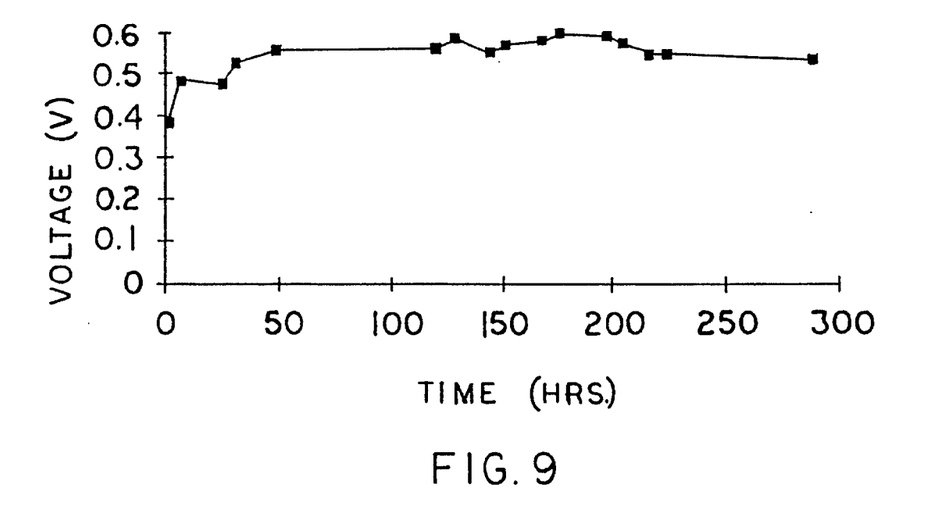

Example 19. A life study was performed for nearly 300 hours using a fuel cell as described in Example 18 above, operated at a constant current density of 200 mA/cm2 with a fuel feed of 1000 ppm $H_2S$ in hydrogen. As shown by the plot of voltage versus time in FIG. 9, after equilibration, the fuel cell operated with substantially stable performance.

Examples 20–23. The non-bonded, solid oxide electrolyte fuel cells described in examples 20–23 of Table III were each prepared by altering the composition of the electrolyte interfacial layer proximate to the anode only, while maintaining standard Ni/YSZ bulk anodes for electrical contact. The fuel cells were tested by operation at 1000° C., at a fuel feed rate of 100 cm2/minute. The tests were performed by first equilibrating the fuel cell for 24 hours in pure hydrogen, followed by 24 hours operating with hydrogen plus 300 ppm hydrogen sulfide. Voltage measurements were taken after 24 hours run time with each fuel, and are reported in Table III.

TABLE III

Effect of Composition of Anode Interfacial Layer

| Example Number | Anode Interfacial Layer Composition | Voltage $H_2$ | Voltage $H_2S$ | % Power Loss $H_2S$ | Current Density mA/cm2 |
|---|---|---|---|---|---|
| 20 | La—$CeO_2$ | 0.746 | 0.758 | 0 | 65 |
| 21 | $(FeCu)_{60}(Y—CeO_2)_{40}$ | 0.646 | 0.622 | 3.7 | 200 |
| 22 | $(Nb—TiO_2)_{60}(La—CeO_2)_{40}$ | 0.705 | 0.691 | 2.0 | 27 |
| 23 | $(Ni)_{60}(Y—CeO_2)_{40}$ | 0.720 | 0.727 | 0 | 200 |

The fuel cells of examples 20–23 exhibit sulfur tolerance. The data in Table III demonstrates that the electrolyte interfacial layer proximate the anode (anode interfacial layer) affects fuel cell performance and provides sulfur tolerance when appropriate sulfur tolerant compositions are utilized. Further, it demonstrates that the standard Ni/YSZ bulk electrode can still be used in a sulfur tolerant, non-bonded solid oxide electrolyte fuel cell.

The sulfur tolerant materials utilized for the interfacial layer, anode and/or reactive microslip layer may consist essentially of all ceramic materials (examples 20 and 22). Further, the sulfur tolerant materials utilized for the interfacial layer, anode and/or reactive microslip layer may consist essentially of all mixed ionic/electronic conductor materials, rather than a mixture of an ionic conductor and an electronic conductor (example 20).

The results shown in the above examples demonstrate that the use of non-bonded electrodes, particularly in combination with improved interfacial layer and/or anode compositions results in an solid electrolyte fuel cells that are completely tolerant of sulfur bearing fuels at high concentrations of sulfur, comparable to those commonly found in diesel or jet fuels.

Improved sulfur tolerance is demonstrated in non-bonded solid electrolyte fuel cells when only the interfacial layer of anode material on the surface of the electrolyte proximate the anode comprises the sulfur tolerant materials, such as the mixed ionic-electronic conducting materials described above. Alternatively, greatly improved performance is demonstrated when the interfacial layer and the anode comprises a sulfur tolerant, mixed ionic-electronic material, preferably with a reactive microslip layer of a sulfur tolerant material.

As demonstrated above, fabrication of the bulk electrode, such as by tape casting results in controlled porosity and good performance. The use of a conventional nonbonded fuel electrode, or bulk anode, with the modification according to the present invention of the electrolyte interfacial layer, and/or anode, and/or microslip layer to comprise a sulfur tolerant material results in improved performance of the fuel cell in the presence of a sulfur containing fuel. When only the interfacial layer comprises a sulfur tolerant material, the use of a metal for the thin interfacial layer that is more expensive than Ni can therefore be used with little effect on the overall cost of the fuel cell.

In addition to planar, nonbonded fuel cells, in particular the sulfur tolerant embodiments of the present invention are applicable to tubular nonbonded fuel cells. It should be appreciated that the present invention is not limited to the specific embodiments described above, but includes variations, modifications and equivalent embodiments defined by the following claims.

We claim:

1. An electrochemical apparatus having a solid electrolyte disposed between an oxygen electrode and a fuel electrode, at least one separator contacting the surface of one of the electrodes opposite the electrolyte, and a reactive microslip zone disposed between the electrolyte and at least one electrode, wherein the reactive microslip zone has interconnected pores of a lesser average diameter than the pores of the adjacent electrode, wherein the electrolyte has a fuel electrode material interfacial layer on the electrolyte surface proximate to the fuel electrode, and wherein at least one of the interfacial layer, the fuel electrode, and the reactive microslip zone comprises at least one sulfur tolerant material.

2. The electrochemical apparatus as in claim 1 wherein the fuel electrode comprises at least one sulfur tolerant material.

3. The electrochemical apparatus as in claim 1 wherein the reactive microslip zone is adjacent the fuel electrode and comprises at least one sulfur tolerant material.

4. The electrochemical apparatus as in claim 3 wherein the reactive microslip zone and the fuel electrode each comprise at least one sulfur tolerant material.

5. The electrochemical apparatus as in claim 1 wherein the interfacial layer comprises a sulfur tolerant material.

6. The electrochemical apparatus as in claim 1 wherein the sulfur tolerant material comprises a conductor selected from the classes consisting of electronic, ionic, mixed ionic/electronic and combinations thereof.

7. The electrochemical apparatus as in claim 1 having a first said reactive microslip zone disposed between the oxygen electrode and the electrolyte and a second said reactive microslip zone disposed between the fuel electrode and the electrolyte.

8. The electrochemical apparatus as in claim 1 comprising a planar, nonbonded solid electrolyte fuel cell.

9. An electrochemical apparatus comprising a fuel cell having an electrolyte disposed between a fuel electrode and a second electrode, wherein a fuel electrode material interfacial layer is further disposed between the electrolyte and the fuel electrode, said interfacial layer comprising at least one sulfur tolerant material comprising a conductor selected from the classes consisting of electronic, ionic, mixed ionic/electronic and combinations thereof.

10. The electrochemical apparatus as in claim 9 wherein the sulfur tolerant interfacial layer intimately contacts a surface of the electrolyte proximate to the fuel electrode.

11. The electrochemical apparatus as in claim 10 wherein the fuel electrode comprises at least one said sulfur tolerant material.

12. A solid electrolyte electrochemical apparatus having a solid electrolyte disposed between an oxygen electrode and a fuel electrode in a cell, and at least one separator contacting the surface of one of the electrodes opposite the electrolyte, wherein the electrolyte has a fuel electrode material interfacial layer on the electrolyte surface proximate to the fuel electrode and wherein at least one of the electrodes has enhanced, fixed interconnected porosity of greater than about 50% to about 90% to substantially eliminate gas backflow in the cell, said at least one electrode being contiguous to an electrical contact zone adjacent to the electrolyte, and wherein at least one of the fuel electrode and the interfacial layer comprise at least one sulfur tolerant material.

13. The electrochemical apparatus as in claim 12 wherein the interfacial layer comprises at least one sulfur tolerant fuel electrode material.

14. The electrochemical apparatus as in claim 12 wherein the fuel electrode comprises at least one sulfur tolerant fuel electrode material.

15. A solid electrolyte electrochemical apparatus having a solid electrolyte disposed between an oxygen electrode and a fuel electrode in a cell, and at least one separator contacting the surface of one of the electrodes opposite the electrolyte, wherein the electrolyte has a fuel electrode material interfacial layer on the electrolyte surface proximate to the fuel electrode and wherein at least one of the electrodes has enhanced, fixed interconnected porosity of greater than about 50% to about 90% to substantially eliminate gas backflow in the cell, said at least one enhanced porosity electrode being contiguous to an electrical contact zone adjacent to the electrolyte, and having a reactive microslip zone disposed between the electrolyte and said at least one enhanced porosity electrode, wherein the reactive microslip zone has interconnected pores of a lesser average diameter than the pores of the enhanced porosity electrode, and wherein at least one of the interfacial layer, the reactive microslip zone, and the fuel electrode comprises at least one sulfur tolerant material.

16. The electrochemical apparatus as in claim 15 having a porosity gradient across the enhanced porosity electrode such that the smaller pore diameter portion of the enhanced porosity electrode is contiguous to the reactive microslip zone.

17. The electrochemical apparatus as in claim 15 wherein the interfacial layer comprises at least one sulfur tolerant material.

18. The electrochemical apparatus as in claim 15 wherein both the oxygen electrode and the fuel electrode have said enhanced interconnected porosity.

19. The electrochemical apparatus as in claim 18 having a first reactive microslip zone comprising substantially the same material as the oxygen electrode disposed between the oxygen electrode and the electrolyte, and a second reactive microslip zone comprising substantially the same material as the fuel electrode disposed between the fuel electrode and the electrolyte, wherein the first reactive microslip zone and the second reactive microslip zone have interconnected pores of a lesser average diameter than the pores of the adjacent enhanced porosity electrode.

20. The electrochemical apparatus as in claim 15 wherein the fuel electrode comprises at least one sulfur tolerant material.

21. The electrochemical apparatus as in claim 15 wherein the reactive microslip zone comprises at least one sulfur tolerant material.

22. A process for utilizing a sulfur bearing fuel in an electrochemical apparatus including introducing a fuel containing at least about 2 ppm sulfur species, at reaction temperature, into a nonbonded solid oxide electrolyte fuel cell, and reacting said fuel.

23. The process as in claim 22, wherein said fuel contains at least about 300 ppm sulfur bearing species.

24. The process as in claim 22, wherein said fuel is selected from the group consisting of natural gas, landfill methane gas, coal derived fuel gas and mixtures thereof.

25. The process as in claim 22, wherein said fuel is selected from the group consisting of diesel fuel and jet fuel.

26. A process for utilizing a sulfur bearing fuel in an electrochemical apparatus including:
providing a fuel cell having an electrolyte disposed between a fuel electrode and a second electrode, wherein a fuel electrode material interfacial layer is further disposed between the electrolyte and the fuel electrode, and wherein at least one of the interfacial layer and the fuel electrode comprises at least one sulfur tolerant material;
introducing a fuel containing at least about 2 ppm sulfur species, at reaction temperature, into said fuel cell; and,
reacting said fuel.

27. The process as in claim 26 wherein said fuel contains at least about 300 ppm sulfur bearing species.

28. The process as in claim 26 wherein said interfacial layer comprises at least one said sulfur tolerant material.

29. The process as in claim 26 wherein said fuel electrode comprises at least one said sulfur tolerant material.

30. The process as in claim 26, wherein said fuel is selected from the group consisting of natural gas, landfill methane gas, coal derived fuel gas and mixtures thereof.

31. The process as in claim 26, wherein said fuel is selected from the group consisting of diesel fuel and jet fuel.

32. The process as in claim 26, wherein a reactive microslip zone is disposed between the interfacial layer and the fuel electrode, said reactive microslip zone comprising at least one sulfur tolerant material.

33. An electrochemical apparatus comprising a fuel cell having an electrolyte disposed between a fuel electrode and a second electrode, wherein a fuel electrode material interfacial layer is further disposed between the electrolyte and the fuel electrode, and wherein at least one of the interfacial layer and the fuel electrode comprises at least one sulfur tolerant material.

34. The electrochemical apparatus of claim 33 wherein the sulfur tolerant material comprises a conductor selected from the classes consisting of electronic, ionic, mixed ionic/electronic and combinations thereof.

35. The electrochemical apparatus as in claim 33 comprising a planar, nonbonded solid electrolyte fuel cell.

36. The electrochemical apparatus of claim 33, wherein a reactive microslip zone is disposed between the interfacial layer and the fuel electrode, said reactive microslip zone comprising at least one sulfur tolerant material.

37. The electrochemical apparatus of claim 33, wherein the interfacial layer comprises said at least one sulfur tolerant material.

38. The electrochemical apparatus of claim 33, wherein the fuel electrode comprises said at least one sulfur tolerant material.

39. An electrochemical apparatus comprising a fuel cell having an electrolyte disposed between a fuel electrode and a second electrode, wherein a fuel electrode material interfacial layer is further disposed between the electrolyte and the fuel electrode, and wherein at least one of the interfacial layer and fuel electrode comprises at least one sulfur tolerant conductor selected from:

(I) Ag, Co, Cr, Cu, Fe, Ni, Pd, Pt, Ru, and alloys and mixtures thereof;

(II) Oxides of the general formula $M_yM'_{1-y}O_x$, wherein at least one M element is different than at least one M' element, wherein M is selected from Ba, Nb, Sr, and mixtures thereof, M' is selected from Ti, Sm, Nb and mixtures thereof, and wherein $0 \leq y \leq 1$ and x is a number sufficient to satisfy the valence requirements of the other elements;

(III) Perovskites of the general formula $(A_{1-a}A'_a)(B_bB'_{1-b})O_{3-c}$, wherein A is selected from lanthanides, La, Y, Nb, Ta, Pb and mixtures thereof, A' is selected from alkaline earth metals such as Ba, Ca, Mg, Sr and mixtures thereof, B is selected from lanthanides and mixtures thereof, and B' is selected from Al, Cr, Nb, Ti, Zr and mixtures thereof, wherein $0.9 \leq (A+A')/(B+B') \leq 1.1$, preferably $0.99 \leq (A+A')/(B+B') \leq 1.01$; and wherein $0 \leq a \leq 1$; $0 \leq b \leq 1$; and c is a number that renders the composition charge neutral in the absence of an applied potential;

(IV) Oxides of the general formula $Me_zMe'_{1-z}O_x$, wherein at least one Me element is different than at least one Me' element, wherein Me is selected from Group 2a and 3a (IUPAC) metals, lanthanides, Cr, Fe, In, Nb, Pb, Sn, Ta, Ti, and mixtures thereof, Me' is selected from Bi, Ce, In, Th, U, Zr and mixtures thereof, and wherein $0 \leq z \leq 1$ and x is a number sufficient to satisfy the valence requirements of the other elements;

(V) Perovskites of the general formula $(D_{1-d}D'_d)(E_eE'_{1-e})O_{3-f}$, wherein D is selected from lanthanides, La, Y, Nb, Ta, and mixtures thereof, D' is selected from alkaline earth metals such as Ba, Ca, Mg, Sr and mixtures thereof, E is selected from lanthanides and mixtures thereof, and E' is selected from Co, Cr, Cu, Fe, Ni, Zr and mixtures thereof, wherein $0.9 \leq (D+D')/(E+E') \leq 1.1$, preferably $0.99 \leq (D+D')/(E+E') \leq 1.01$; and wherein $0 \leq d \leq 1$; $0 \leq e \leq 1$; and f is a number that renders the composition charge neutral in the absence of an applied potential.

40. The electrochemical apparatus of claim 39 wherein the sulfur tolerant conductor is selected from:

I. Nb-doped $TiO_2$; $G_yTi_{1-y}O_x$ wherein G is selected from Ca, Ce, Sm, Sr and mixtures thereof and $0 \leq y \leq 1$; and, first dopant doped $NbO_2$, $LaCrO_3$ and $YCrO_3$ wherein the first dopant is selected from alkaline earth metals and rare earth metals;

II. Sc, Tb, Ti, or Y-doped $ZrO_2$; Gd, La, Sm, or Y-doped $CeO_2$; and, second dopant doped $Bi_2O_3$, $ThO_2$, $LaFeO_3$ and $UO_2$ wherein the second dopant is selected from alkaline earth metals and rare earth metals.

41. The electrochemical apparatus of claim 39, wherein a reactive microslip zone is disposed between the interfacial layer and the fuel electrode, said reactive microslip zone comprising said at least one sulfur tolerant conductor.

* * * * *